United States Patent [19]
Baker et al.

[11] Patent Number: 5,456,651
[45] Date of Patent: Oct. 10, 1995

[54] AUTOMATIC BAG FOLDING APPARATUS

[75] Inventors: William F. Baker, Scottsdale; Don Reed, Phoenix, both of Ariz.

[73] Assignee: Automated Solutions, Inc., Phoenix, Ariz.

[21] Appl. No.: 148,977

[22] Filed: Nov. 8, 1993

[51] Int. Cl.[6] .......................... B60R 21/16; B31B 1/26; B65H 45/02
[52] U.S. Cl. .......................... 493/405; 493/243; 493/451
[58] Field of Search .................................. 493/243, 244, 493/266, 267, 314, 405, 406, 450, 451, 457, 458, 940; 53/429; 280/743

[56] References Cited

U.S. PATENT DOCUMENTS

| | | | |
|---|---|---|---|
| 3,839,947 | 10/1974 | Kornas et al. | 93/32 |
| 3,839,948 | 10/1974 | Putti et al. | 93/32 |
| 4,351,544 | 9/1982 | Ross | 280/743 |
| 5,022,675 | 6/1991 | Zelenak, Jr. et al. | 280/743 |
| 5,140,799 | 8/1992 | Satoh | 53/429 |
| 5,162,035 | 11/1992 | Baker | 493/405 |
| 5,163,893 | 11/1992 | Hara et al. | 493/458 |
| 5,300,011 | 4/1994 | Budde et al. | 493/405 |

*Primary Examiner*—Bruce M. Kisliuk
*Assistant Examiner*—Christopher W. Day
*Attorney, Agent, or Firm*—Parsons & Associates; Don J. Flickinger; Robert A. Parsons

[57] ABSTRACT

An automatic bag folding apparatus is disclosed for folding vehicular air bags. The bag folding apparatus includes a base, a holding fixture, an end fold assembly, and a tuck assembly. The air bag folded by the apparatus may be coupled to a reaction plate with a center portion of the air bag overlying the reaction plate and parameters of the center portion defined by the reaction plate. The air bag further includes side folds and a first end adjacent the center portion. The holding fixture receives the reaction plate, thereby securing the center portion of the air bag. The end fold assembly is carried by the base, and has an end fold blade movable between a support position spaced from the holding fixture for supporting the first end of the air bag, and a fold position adjacent the holding fixture for folding the first end to form an end fold. The tuck assembly is carried by the base for forming an end tuck in the end fold.

35 Claims, 9 Drawing Sheets

AUTOMATIC BAG FOLDING APPARATUS

BACKGROUND OF THE INVENTION

1. Field of the Invention

This invention relates to the folding of flexible, sheet-like articles, such as bags.

More particularly, the present invention relates to folding vehicular air bags.

In a further and more specific aspect, the present invention concerns a method and apparatus for automated folding of vehicular air bags.

2. The Prior Art

Vehicular air bags are among the latest safety enhancements for automobiles and other vehicles. Their use in vehicles is increasing dramatically. Generally, such air bags are located within a steering wheel or column, dashboard, control panel, or other out-of-the-way location which is near a vehicle's occupant. Sensors located in the vehicle detect when a crash is occurring and activate the air bag(s). When activated, the air bags rapidly inflate between the vehicle's occupant and a potentially injurious or deadly surface, such as a steering wheel. As the crash progresses, the force of the crash may hurl the occupant toward the injurious or deadly surface, but the occupant first encounters the air bag, which prevents or otherwise lessens injury to the occupant.

In order for the air bag to be effective, it must be stored in an out-of-the-way location until needed. Moreover, it must be stored in such a manner that it can be rapidly activated to do its job. Due to the continual down-sizing of vehicles, the out-of-the-way locations where air bags are typically located are usually rather small. Thus, an air bag must be folded into a small package so that it fits into a small location. But, the technique used to fold the air bag affects its deployment when activated. To minimize the possibility of harm to a vehicle occupant, the air bag preferably deploys evenly in a spreading out (side-to-side) manner rather than shooting first toward one side then the other or shooting straight out then filling in from side-to-side.

The conventional process for folding vehicular air bags relies almost exclusively on manual labor. This conventional process is plagued with problems. For example, approximately 12 minutes are required to fold an air bag using manual labor. With the large number of air bags now being used in vehicles, a tremendous amount of labor and expense is required to fold air bags. Moreover, the folding of air bags requires a large number of highly repetitive manual motions. Such repetitive motions are potentially hazardous to the health of the manual laborers. In addition, such repetitive motions lead to boredom, which in turn leads to a poor performance of the job.

Another problem relates to the consistency with which air bags are folded using the conventional process. While some bags get folded acceptably, others tend to be folded using a less-than-optimal folding pattern or in a manner which results in an overly large package. This lack of consistency results in a considerable amount of rework, which is expensive, and inconsistent bag deployment patterns, which may pose unnecessary dangers to vehicle occupants.

Recent innovations have been developed in an attempt to automate the folding of air bags. These innovations have only been partially effective, however, since only a portion of the bag folding process is automated. Generally, depending upon the type of air bag to be folded, the bag folding process can be divided into two main sequences. When an air bag is of the type which can lay substantially flat, in other words one which does not have sides panels, but instead includes a top portion and a bottom portion joined at a periphery, is required to be folded, the two main sequences include a side fold sequence and an end reduction sequence. The side fold sequence reduces the bag to the desired width. The end reduction sequence folds the side folded bag into the small compact package necessary for installation on a vehicle.

A bag folding system has been developed, which is partially automated, automatically completing the first or side fold sequence of the process. Air bags characteristically have top and bottom sections with the bottom section fastened to a reaction plate. The side folding system employs horizontal side blades over which the air bag is spread. A center blade assembly having horizontal slots for receiving the horizontal blades is positioned over the air bag. The horizontal blades force the air bag into the slots, forming side folds. While effective when used, this side folding system cannot be used when the reaction plate has any upwardly extending fixtures. The upwardly extending portions of the reaction plate interfere with the horizontal blades. Therefore, these bags must be folded manually. Furthermore, while somewhat effective at completing the side fold sequence, the end reduction sequence is accomplished manually.

It would be highly advantageous, therefore, to remedy the foregoing and other deficiencies inherent in the prior art.

Accordingly, it is an object of the present invention to provide improvements in folding air bags.

Another object of the present invention is to provide an improved air bag folding system.

And another object of the present invention is to provide an automated system for folding air bags.

Still another object of the present invention is to provide a system for quickly and efficiently folding air bags.

Yet another object of the present invention is to provide a system for uniformly folding air bags.

Yet still another object of the present invention is to provide a system for consistently folding air bags to achieve a desirable deployment pattern.

A further object of the present invention is to provide a system for consistently folding air bags to achieve a small folded-bag profile.

And a further object of the present invention is to provide a system which automatically performs a side fold sequence.

And yet another object of the present invention is to provide a system which automatically performs an end reduction sequence.

And another object of the present invention is to provide a system which automatically performs a side fold sequence on air bags with reaction plates having upwardly projecting portions.

SUMMARY OF THE INVENTION

Briefly, to achieve the desired objects of the instant invention in accordance with a preferred embodiment thereof, provided is an apparatus which automatically folds an air bag having a center portion, and a first end. The air bag is coupled to a reaction plate with the center portion overlying the reaction plate and parameters of the center portion defined by the reaction plate. The apparatus includes a base, a holding fixture carried by the base for receiving the reaction plate and securing the center portion of the air bag, an end fold assembly carried by the base and an end tuck assembly carried by the base. The end fold assembly includes an end fold blade movable between a support position spaced from the holding fixture for supporting the first end of the air bag, and a fold position adjacent the holding fixture for folding the first end to form an end fold. The tuck assembly forms an end tuck in the end fold.

The end fold assembly is movably carried by the base, between a retracted position spaced from the holding fixture, in which position the end fold blade supports and folds the first end of the air bag, and an extended position adjacent the holding fixture, in which position the end fold blade folds the end tuck against the center portion of the air bag.

It is further contemplated that the tuck assembly includes a carriage, a fold rod and an end tuck blade, the carriage is movably carried by the base, between a retracted position spaced from the holding fixture and an extended position adjacent the holding fixture. The fold rod is movably carried by the carriage and configured to closely overlie the first end of the air bag with the carriage in the extended position, and extend between the end fold blade in the support position, and the holding fixture. The tuck blade is movably carried by the carriage, and configured to underlie the first end of the air bag with the carriage in the extended position, extending between the end fold blade in said support position and the holding fixture. The tuck blade is substantially parallel to said fold rod.

Also provided is a clamp assembly movably carried by the base, for clamping the end fold to the center portion of the air bag. The clamp assembly includes a carriage movably carried by the base, movable between a retracted position and an extended position. The clamp assembly further includes a clamp blade movably coupled to an attachment portion, the clamp blade movable between a raised and a lowered position and the attachment member movably coupled to the carriage, the attachment portion movable between a vertical position and a tilt position.

Further provided by the instant invention is a second end fold assembly carried by the base and a second tuck assembly carried by the base. The second end fold assembly includes an end fold blade movable between a support position spaced from the holding fixture for supporting a second end of the air bag, and a fold position adjacent the holding fixture for folding the second end to form an end fold. The second tuck assembly forms an end tuck in the second end fold.

Further contemplated by the present invention is a side fold assembly for forming side folds in the air bag, and a bag compression assembly for compressing and retaining the side folds in the air bag.

The above problems are solved, and the above objects are realized in a method of folding an air bag having a center portion, the air bag coupled to a reaction plate with the center portion overlying the reaction plate and parameters of the center portion defined by the reaction plate. The air bag is folded by forming side folds in the air bag so as to define a first end adjacent to the center portion, and automatically reducing the first end of the side folded air bag, to overlie the center portion and to fit within the parameters thereof.

The end reduction includes engaging the first end of the air bag with an end tuck assembly including a fold rod and a tuck blade parallel to and spaced from the fold rod, and folding the first end about the fold rod so as to form an end fold. The end fold is then tucked by rotating the tuck blade relative the fold rod, and moving the fold rod, thereby producing an end tuck. The end tuck is then moved to a folded position overlying the center portion.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which.

DETAILED DESCRIPTION OF THE PREFERRED EMBODIMENT

Figure 1:
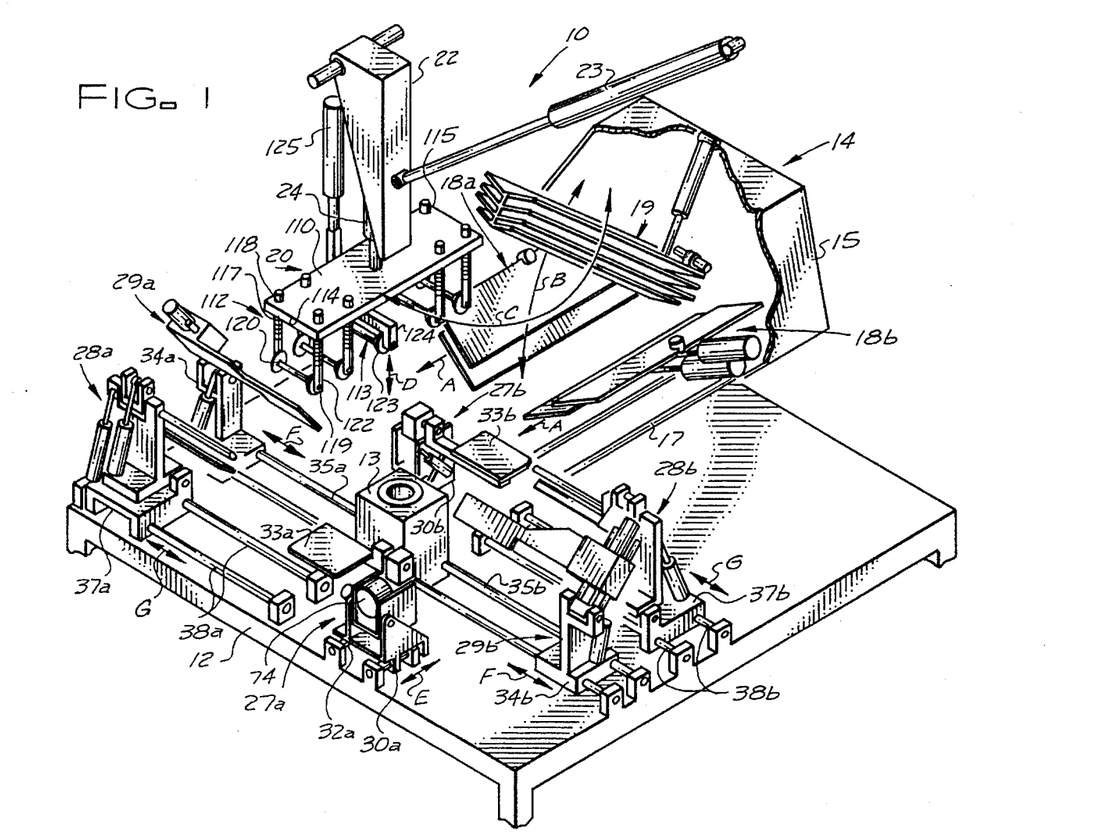
FIG. 1 is a perspective view of an air bag folding apparatus, constructing in accordance with the teaching of the instant invention.

Turning now to the drawings in which like reference characters indicate corresponding elements throughout the several views, attention is first directed to FIG. 1 which illustrates a bag folding apparatus generally designated by the reference character 10. Bag folding apparatus 10 consists of a base 12 having a holding fixture 13 rigidly attached thereto. Holding fixture 13 is the focus of various elements employed in automatically folding an air bag. In accordance with the present invention, the process of folding an air bag consists of two general sequences, the first sequence is to form side folds, the second sequence is to form end reductions of the air bag having side folds. Base 12 carries elements for accomplishing both sequences to reach the final folded bag.

Figure 2:
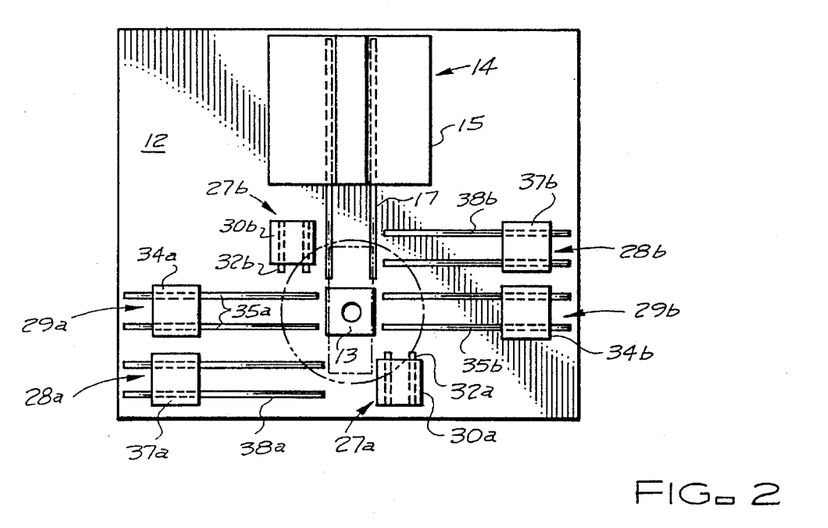
FIG. 2 is a top plan view of the air bag folding apparatus of FIG. 1.

To produce the side folds of the first sequence, a side fold assembly 14 is movably carried by base 12. Side fold assembly 14 consists of a side fold carriage 15 slideably mounted on rails 17. As can be seen with additional reference to FIG. 2, rails 17 extend outward from holding fixture 13, allowing side fold carriage 15 to be moved between an extended position adjacent holding fixture 13, and a retracted position spaced apart from holding fixture 13 as indicated by arrowed lines A. Side fold assembly 14 further includes a pair of opposing side blade assemblies 18a and 18b, and a center blade assembly 19, each carried by side fold assembly 14. In the extended position, side blade assemblies 18a and 18b are positioned above and bracket holding fixture 13. Center blade assembly 19 is hinged at one end to allow movement between a lowered position, between opposing side blade assemblies 18a and 18b directly over holding fixture 13, and a raised position as indicated by double arrowed arcuate line B. Side fold assembly 14 and its operation will be discussed in greater detail subsequently during the description of the operation of bag folding apparatus 10.

To aid in the transition between the side fold sequence and end reduction sequence, a bag compression assembly 20 is provided which acts to retain the side folds formed in the air bag as side fold assembly 14 is removed and the end reduction sequence begins. Bag compression assembly 20 is supported above base 12 by a pivoting support 22. Pivoting support 22 is supported by a frame of bag folding apparatus 10. The frame is not shown for reasons of clarity, but will be readily understood by one skilled in the art. Pivoting support 22 is pivoted between a centered position directly over holding fixture 13 and a withdrawn position, by an actuator 23, in a direction indicated by arcuate arrow C. A second actuator 24 raises and lowers bag compression assembly 20, in a direction indicated by double arrowed line D, when in the centered position. Air bag compression assembly 20 and its operation will be discussed in greater detail subsequently, during the description of the operation of bag folding apparatus 10.

To perform the end reduction sequence, apparatus 10 further includes a pair of opposing end fold assemblies 27a and 27b, a pair of opposing end tuck assemblies 28a and 28b at right angle to end fold assemblies 27a and 27b, and a pair of opposing clamp assemblies 29a and 29b which operate parallel to end tuck assemblies 28a and 28b. These elements act in concert to produce the end reduction sequence of the bag folding process.

End fold assemblies 27a and 27b include end fold carriages 30a and 30b slideably mounted on rails 32a and 32b carried by base 12. With additional reference to FIG. 2, rails 32a and 32b are mounted parallel to rails 17 of side fold assembly 14 and on opposite sides of holding fixture 13. End fold assemblies 27a and 27b are movable between an extended position adjacent holding fixture 13 and a retracted position spaced from holding fixture 13 in a direction indicated by double arrowed line E. As can be seen in FIG. 1, end fold assemblies 27a and 27b include end fold blades 33a and 33b carried by end fold carriage 30a and 30b respectively. End fold blades 33a and 33b are positioned in alignment, with holding fixture 13 therebetween. It should be noted that side fold assembly 14 overlies end fold blades 33a and 33b when in the extended position.

Clamp assemblies 29a and 29b include clamp carriages 34a and 34b slideably mounted on rails 35a and 35b carried by base 12. With additional reference to FIG. 2, it can be seen that rails 35a and 35b extend from holding fixture 13 in opposite directions, at right angles and between rails 32a and 32b. Clamp assemblies 29a and 29b are movable between an extended position adjacent holding fixture 13 and a retracted position spaced from holding fixture 13, as indicated by double arrowed lines F. End tuck assemblies 28a and 28b include end tuck carriages 37a and 37b slideably mounted on rails 38a and 38b carried by base 12. With additional reference to FIG. 2, rails 38a and 38b are mounted paralleled to an adjacent rails 35a and 35b and on opposite sides thereof. End tuck assemblies 28a and 28b are movable between an extended position adjacent holding fixture 13 and a retracted position spaced from holding fixture 13 as indicated by double arrowed lines G.

Figures 3, 4, 5, 6, 7:
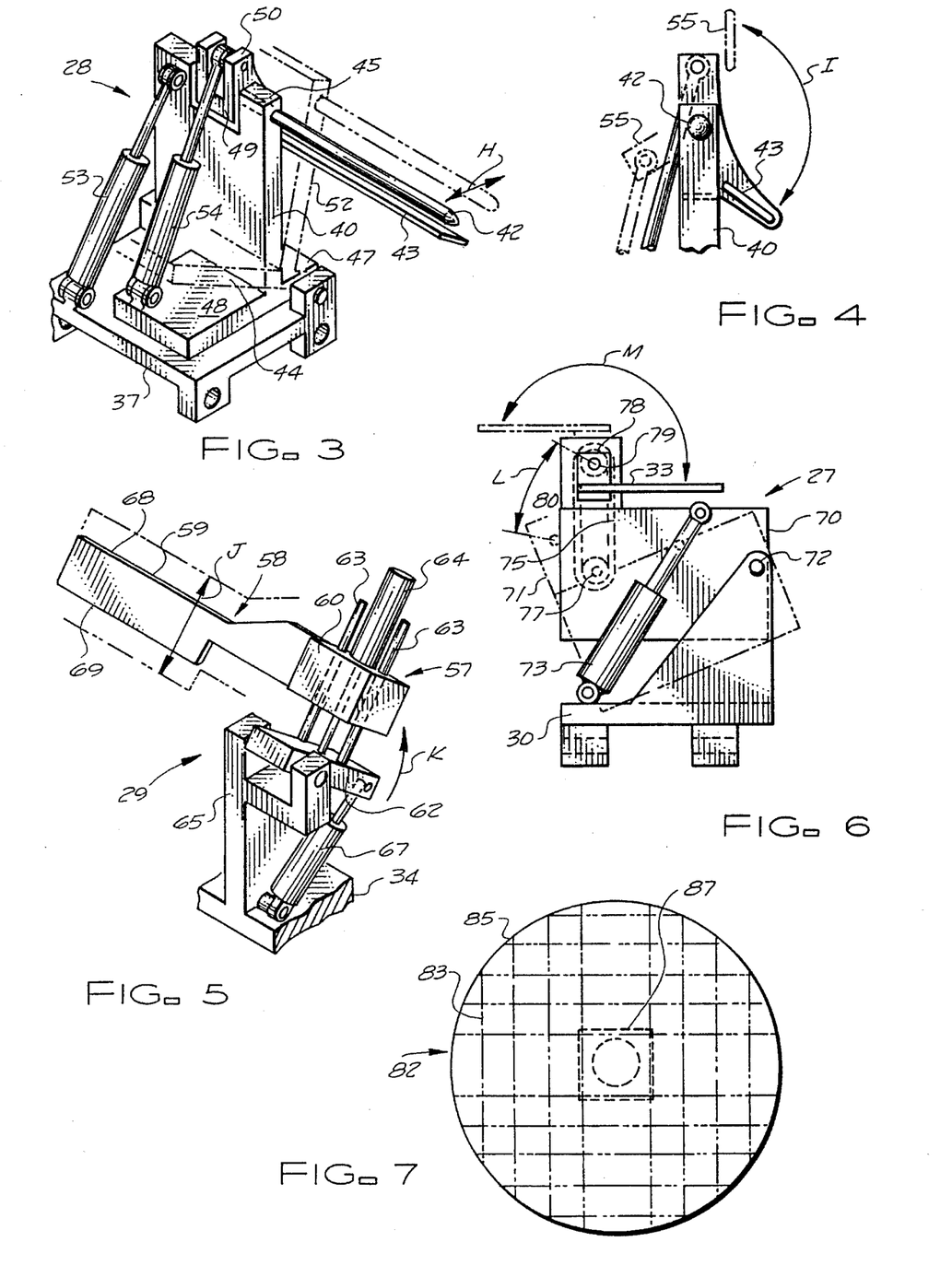
FIG. 3 is an enlarged perspective view of an end tuck assembly of the air bag folding apparatus.
FIG. 4 is an enlarged side view of a portion of the end tuck assembly.
FIG. 5 is an enlarged perspective view of a clamp assembly of the air bag folding apparatus.
FIG. 6 is a side view of an end fold assembly of the air bag folding apparatus.
FIG. 7 is a top view of an air bag of the type folded by the air bag folding apparatus.

Referring now to FIG. 3, end tuck assembly 28 is illustrated, consisting of end tuck carriage 37 carrying a tilt plate 40, a fold rod 42 and a tuck blade 43. Tilt plate 40 is preferably a rectangular member having a carriage end 44 and a clevis end 45. Carriage end 44 is pivotally coupled to end tuck carriage 37, by a pivot flange 47 extending perpendicularly outward therefrom. An actuator flange 48 extends from carriage end 44 perpendicular to tilt base 40 and opposite pivot flange 47. Clevis end 45 has a notch 49 formed therein for receiving a tuck blade clevis 50. Tuck blade 43 extends outward from tuck blade clevis 50 pivotally carried within notch 49, substantially parallel to a surface of tilt plate 40. Fold rod 42 extends from clevis end 45 substantially parallel to tuck blade 43. Tilt plate 40 is moved between a ready position and a tuck position as indicated by double arrowed line H by a tilt actuator 53 coupled between end tuck carriage 37 and clevis end 45 of tilt plate 40. The tuck position of tilt plate 40 is shown by phantom image 52. A tuck actuator 54 pivots tuck blade clevis 50, moving tuck blade 43 between a ready position and a tuck position as indicated by double arrowed arcuate line I as can be seen in FIG. 4. A phantom image 55 illustrates clevis 50 and tuck blade 43 in the tuck position. Tuck actuator 54 is mounted between actuator flange 48 and tuck blade clevis 50. Therefore, movement of tuck blade 43 between the ready and the tuck position is independent of, but tied to the movement of fold rod 42 between the ready position and the tilt position.

Turning now to FIG. 5, clamp assembly 29 is illustrated and consists of clamp carriage 34 pivotally supporting an actuator assembly 57 which is in turn carrying a clamp blade 58. Clamp blade 58 include a clamp portion 59 having an upper edge 68 and a lower edge 69, and an attachment portion 60 from which clamp portion 59 extends. Actuator assembly 57 include a coupling member 62 from which parallel guide rods 63 extend. Attachment portion 60 of clamp blade 58 is received about guide rods 63, and is moved between a raised position and a lowered position, in the directions indicated by double arrowed line J, by an actuator 64 coupled between coupling member 62 and attachment portion 60. Clamp carriage 34 includes an upwardly extending clevis 65 which pivotally receives coupling member 62. An actuator 67, coupled between clamp carriage 34 and coupling member 62, pivots coupling member 62 and therefore also pivots clamp blade 58 between a vertical position and a tilt position in a direction indicated by arrowed arcuate line K.

Referring now to FIG. 6, end fold assembly 27 is illustrated and consists of end fold carriage 30 pivotally supporting a motor mount 70 at a pivot point 72. An actuator 73 coupled between motor mount 70 and end fold carriage 30 moves motor mount 70 between a raised position and lowered position in the directions indicated by double arrowed arcuate line L. Phantom image 71 illustrates motor mount 70 in the lowered position. A motor 74, which can be seen with reference back to FIG. 1, is carried by motor mount 70 and coupled by a drive coupling 75 such as a chain and sprocket, belt, gears or similar coupling to end fold blade 33. In the preferred embodiment, drive coupling 75 is a chain coupled between a motor sprocket 77 and a blade sprocket 78. Operation of motor 74 causes drive coupling 75 to rotate blade sprocket 78, pivoting end fold blade 33 about a pivot point 79, between a fold position and a support position in the direction indicated by double arrowed arcuate line M. End fold blade 33 is offset from pivot point 79 by a coupling block 80 resulting in end fold blade 33 being higher in the fold position than in the support position. The reasons for this particular operation of end fold assembly 27 will be realized in the ensuing description of the operation of bag folding apparatus 10.

Referring to FIG. 7, an air bag 82 of the general configuration preferred for use in combination with bag folding apparatus 10 is illustrated. Air bag 82 consists of a generally circular top portion 83 coupled to a lower portion 84, visible in FIG. 8, by a seam extending around a periphery 85 thereof. Lower portion 84 has a central opening attached to a reaction plate 87. While FIG. 7 and the subsequent description of the folding process illustrate a generally round two-dimensional air bag coupled to a reaction panel, one skilled in the art will understand that any two dimensional air bags, whether square, rectangular or substantially any other shape may be folded utilizing the present invention. Furthermore, it should be understood that while air bag 82 of FIG. 7 has a top portion 83 coupled to a lower portion 84 by a seam, a bag having the portions weaved into a single unit may also be folded, and the reaction plate is not necessary, with the folding process being accomplished by coupling the lower portion adjacent the opening, to a holding fixture.

As described previously, bag folding apparatus includes elements for performing two folding sequences, a side fold sequence and an end reduction sequence. One skilled in the art will understand that an apparatus employing only the side fold elements may be used, with the end reduction sequence performed manually. Likewise, a machine including only the end reduction elements may be employed to perform the end reduction sequence upon an air bag which has already undergone the side fold sequence either manually or in a separate side folding apparatus. While the preferred bag folding apparatus includes elements for both the side fold sequence and the end reduction sequence, it will be understood that each may be used separately.

Figures 8, 9, 10A:
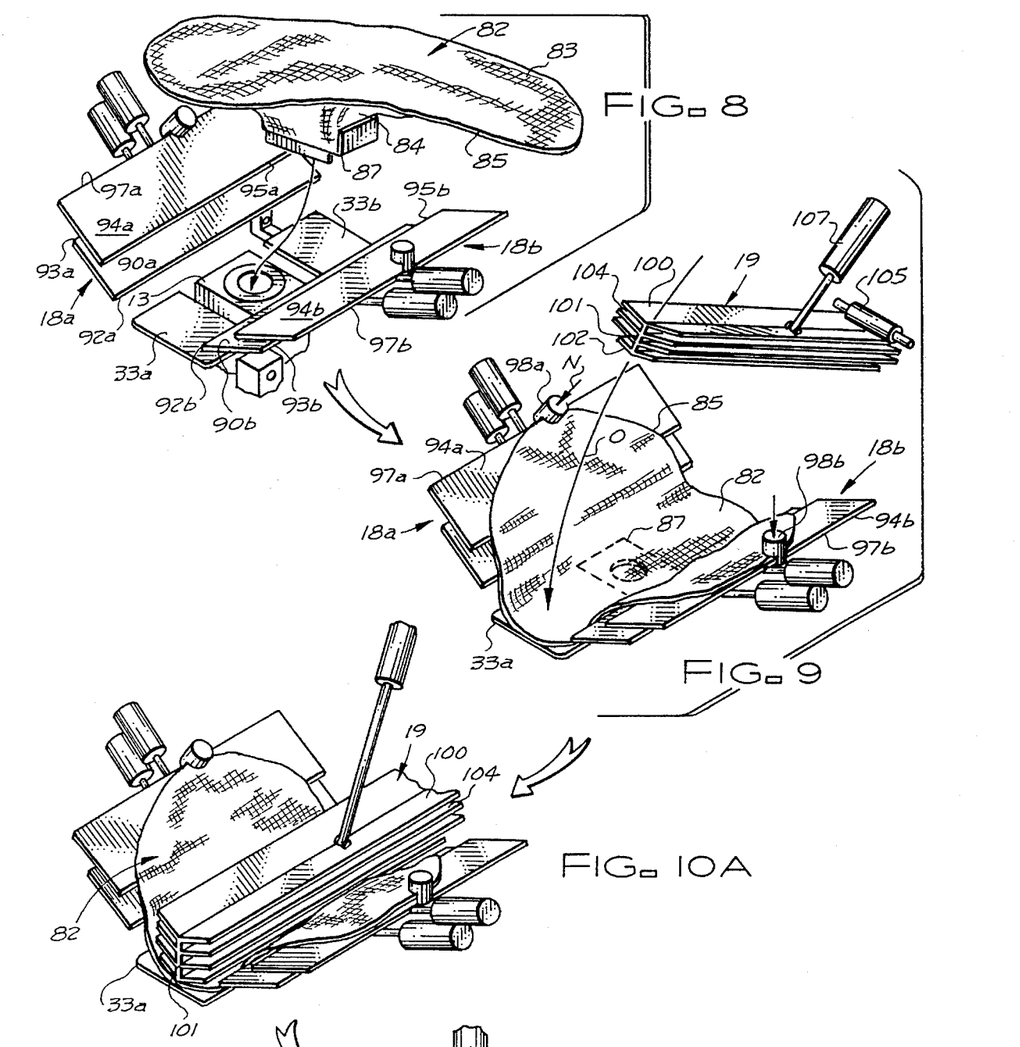
FIG. 8 is a perspective view of a portion of the bag folding system of FIG. 1, as it would appear during the installation of an air bag prior to folding.
FIG. 9 is a perspective view of a portion of the bag folding system of FIG. 1, as it would appear during the positioning of an air bag with respect to a side fold assembly, and positioning of the side fold assembly.
FIG. 10A is a perspective view of a portion of the bag folding system of FIG. 1, as it would appear with the side fold assembly properly positioned prior to commencing the formation of side folds in the air bag.

Turning now to FIG. 8, side blade assemblies 18a and 18b of side fold assembly 14 can be seen in the extended position, bracketing holding fixture 13. Side blade assembly 18a includes a bottom blade 90a having a leading edge 92a and a trailing edge 93a, and a top blade 94a having a leading edge 95a and a trailing edge 97a. Top blade 94a is positioned directly above bottom blade 90a in a parallel spaced apart relationship. Side blade assembly 18b is identical to side blade assembly 18a, including a bottom blade 90b having a leading edge 92b and trailing edge 93b, and a top blade 94b having a leading edge 95b and a trailing edge 97b, therefore, it will not be described in detail. In this preferred embodiment, side blade assemblies 18a and 18b include two blades, but it will be appreciated by those skilled in the art that additional blades may be used to provide additional side folds.

In many types of reaction plates, sides or other portions of the reaction plate extend upward partially blocking access to the air bag. Horizontal side blades in this situation would be blocked, preventing side folding of the air bag. As can be seen in FIG. 8, top blades 94 and bottom blades 90 have leading edges 92 and 95 lower than trailing edges 93 and 97. This provides a downward slope of the blades towards holding fixture 13, allowing them to pass over upwardly extending portion of reaction plate 87, while still producing side folds which begin proximate reaction plate 87.

Turning to FIG. 9, after reaction plate 87 is installed in holding fixture 13, air bag 82 is spread out over and supported by top blades 94 and end fold blades 33 in the support position, as discussed previously. Air bag 82 is retained on top blades 94, against their downward slope by bag clamps 98a and 98b, each fixed to trailing edge 97a and 97b of top blades 94a and 94b respectively. Clamps 98 are moved toward top blades 94 by an actuator (not shown) in a direction indicated by arrowed line N. When air bag 82 is properly positioned, center blade assembly 19 is pivoted downward into the lowered position.

Center blade assembly 19 consists of a plurality of stacked center blades 100 joined along a center line by a center divider 101 extending from a free end 102 to a hinged end 103. Center blades 100 are angled upward forming a general chevron arrangement when viewed from the end, and define slots 104 therebetween. While three slots 104 are shown, one skilled in the art will appreciate that additional slots or fewer slots may be provided by adding or removing blades 100. Center blade assembly 19 is moved to the lowered position, about a hinge 105 at hinge end 103, in a direction indicated by arrowed arcuate line O, by an actuator 107 coupled between the uppermost of blades and side fold carriage 15 (not shown).

Figure 10B:
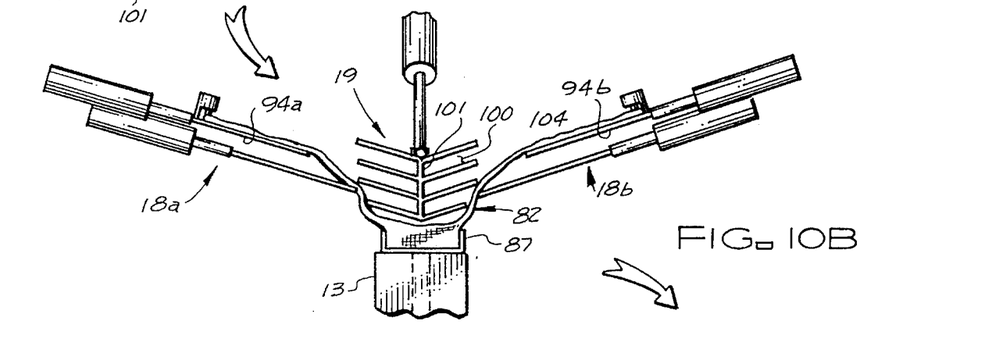
FIG. 10B is an end view of a portion of the bag folding system of FIG. 1, with the side fold assembly properly positioned for commencing the formation of side folds in the air bag.

In the lowered position, the bottom most of center blades 100 closely overlies air bag 82 supported by end fold blades 33 as can be seen in FIG. 10a. Viewed from the end in FIG. 10b, portions of air bag 82 supported by top blades 94 are positioned between side blade assemblies 18 and center blade assembly 19, separating top and bottom blades 94 and 90 respectively from slots 104 aligned therewith.

Figure 11:
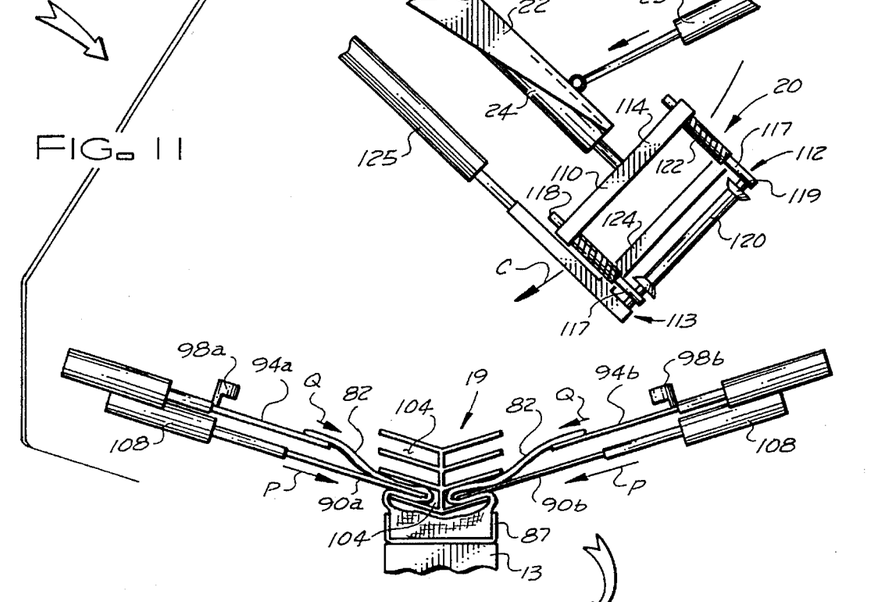
FIG. 11 is a perspective view of a portion of the bag folding system of FIG. 1, as it would appear beginning the formation of side folds and positioning of a bag compression assembly.

Turning to FIG. 11, the actual side folds are produces by extending bottom blades 90 into corresponding slots 104 of center blade assembly 19. Bottom blades 90 are moved from a retracted position to an extended position in a direction indicated by arrowed lines P, by actuators 108. As bottom blades 90 are extended by actuators 108, portions of the air bag 82 adjacent reaction plate 87 are forced into the lower most of slots 104. The process is complicated by clamps 98. Clamps 98 are use to hold air bag 82 on top blades 94. If air bag 82 is not retained in this manner, air bag material will sag below bottom blade 90 causing an inadequate fold. However, as bottom blade 90 is extended forcing air bag 82 into the lowermost of slots 104, periphery 85 of air bag 82 must be released by clamp 98 to allow it to move toward center blade assembly 19 in a direction indicated by arrowed line Q. Timing is critical in this step, with clamps 98 releasing periphery of air bag 82 just after the actuator 108 begins extending bottom blade 90. This may be accomplished in a variety of ways by one skilled in the art, with a time delay being preferred.

Still referring to FIG. 11, at the same time bottom blades 90 are moving to the extended position, air bag compression assembly 20 is moved to the ready position in a direction indicated by arrowed line C as described previously. This is accomplished by activation of actuator 23 coupled between pivoting support 22 and the support structure (not shown) of bag folding apparatus 10.

Bag compression assembly 20 consists of a mounting plate 110 coupled to pivoting support 22, a plurality of compression members 112, and a bag fold retainer 113 best seen with additional reference back to FIG. 1. Mounting plate 110 is a generally planar member having opposing ends 114 and 115 coupled to support member 22 by actuator 24 attached intermediate ends 114 and 115. In this embodiment there are four compression members 112, two proximate each of ends 114 and 115. Each compression member 112 includes a pair of spaced apart roller posts 117 having an end 118 extending through mounting plate 110 and an end 119 supporting a roller 120. Rollers 120 are coupled between pairs of roller posts 117 at ends 119. A compression spring 122 is mounted on each of posts 117 between mounting plate 110 and ends 119. End 118 of each post 117 freely slides through mounting plate 110 from an extended position as seen in FIG. 11 and with reference back to FIG. 1, to a compressed position in which roller posts 117 slide through mounting plate 110, compressing springs 122 each post 117 in a pair is separated sufficiently to carry roller 120 therebetween, with roller 120 having a length at least as great as the width of center blade assembly 19.

Bag fold retainer 113 includes a roller 123 substantially identical to roller 120, and is carried intermediate ends 114 and 115 of mounting plate 110 by a clevis 124 best seen in FIG. 1. Clevis 124 rotatably carries roller 123 and is moved between a raised position and a lowered position by an actuator 125 coupled between pivoting support 22 and clevis 124.

Figures 12A, 12B, 13:
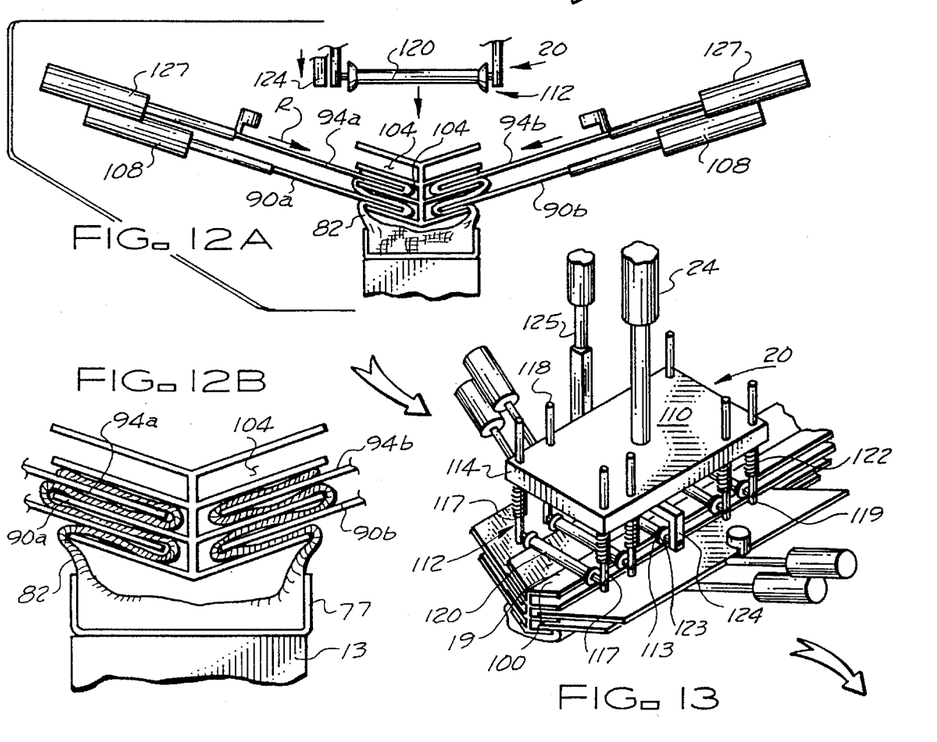
FIG. 12A is a perspective view of a portion of the bag folding system of FIG. 1, as it would appear finishing the formation of side folds and positioning of the bag compression assembly.
FIG. 12B is an enlarged view of the formation of side folds illustrated in FIG. 12A.
FIG. 13 is a perspective view of a portion of the bag folding system of FIG. 1, as it would appear upon completion of the formation of side folds and positioning of the bag compression assembly.

Referring now to FIG. 12A, after full extension of bottom blades 90, top blades 94 are extending from a retracted to an extended position by an actuator 127. Bottom blade 90 is retained in the extended position as top blades 94 force air bag 82 within slot 104 corresponding to top blade 94, preventing withdrawal of that portion of air bag 82 from the lowermost of slots 104. At this point in the side fold procedure, bag compression assembly 20 is moved to the lowered position in the direction of arrowed line D as described previously. Bag compression member 20 is lowered by actuator 124 moving mounting plate 110, and actuator 125 moving clevis 124 of bag fold retainer 113. In the lowered position, as illustrated in FIG. 13, rollers 120 and roller 123 engage the uppermost center blade 100 of center blade assembly 19, moving compression members 112 from the extended position to the compressed position.

FIG. 12B is an enlarged view illustrating the side folds formed when side blades 90 and 94 insert air bag 82 into slots 104.

Figures 14, 15, 16A, 16B, 16C:
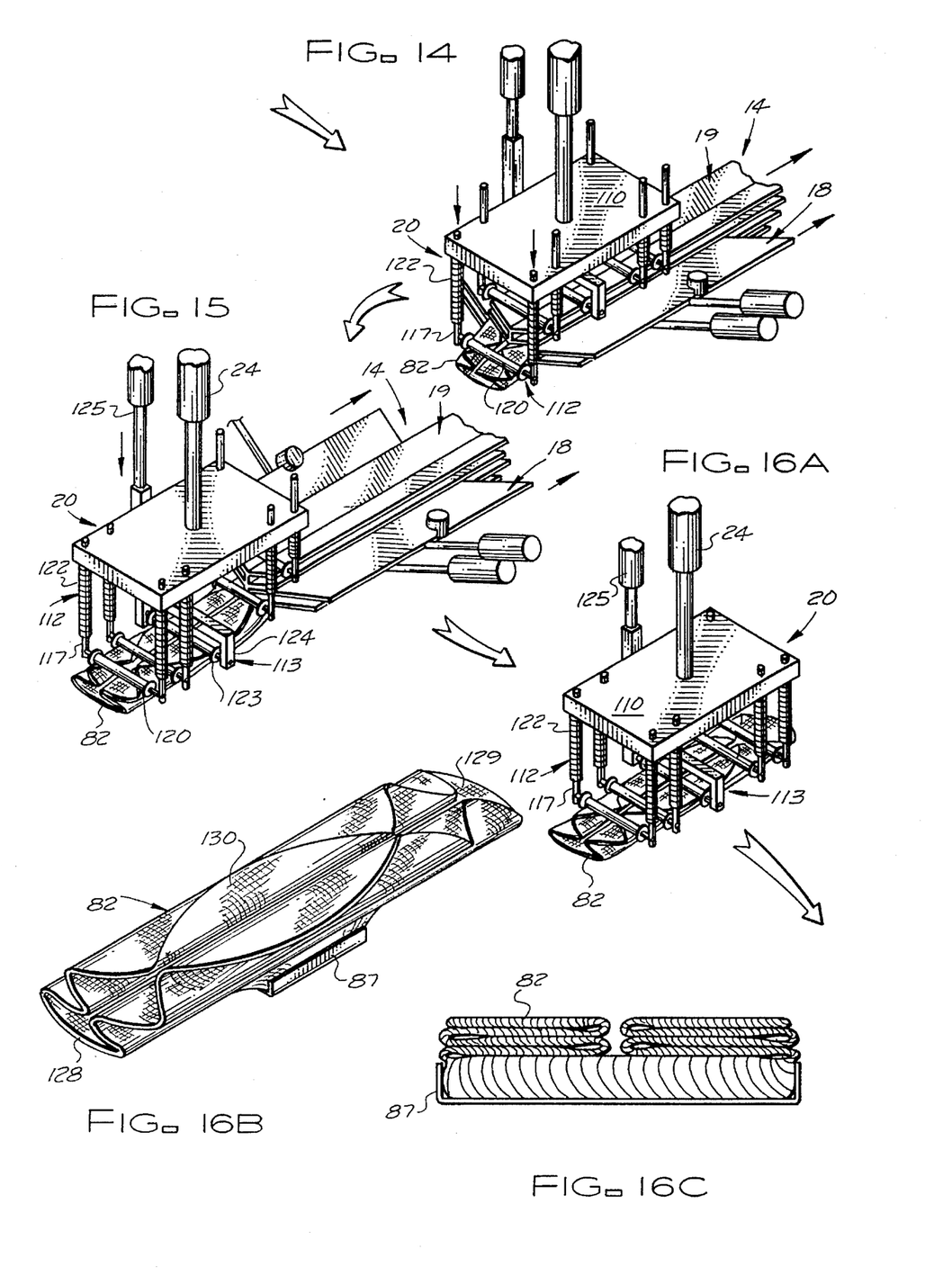
FIG. 14 is a perspective view of a portion of the bag folding system of FIG. 1, as it would appear beginning the removal of the side folding assembly.
FIG. 15 is a perspective view of a portion of the bag folding system of FIG. 1, as it would appear finishing the removal of the side folding assembly.
FIG. 16A is a perspective view of a portion of the bag folding system of FIG. 1, as it would appear after the removal of the side fold assembly, with the bag compression assembly engaging the air bag with side folds.
FIG. 16B is a perspective view illustrating an air bag with side folds.
FIG. 16C is a cross sectional end view of an air bag with side folds.

Referring now to FIGS. 14 and 15, side fold assembly 14 is retracted in a direction indicated by arrowed line A as described previously. As both center blade assembly 19 and side blade assemblies 18 are retracted, air bag 82 is left behind being retained by holding fixture 13. The side folds formed in air bag 82 are prevented from unfolding, and are compressed by compression members 112 which move to the extended position as center blade assembly 19 is retracted from underneath each. As center blade assembly 19 is removed from underneath each compression member 112, compression springs 122 force roller posts 117 downward, compressing and holding air bag 82 with rollers 120. As center blade assembly 19 moves out from underneath roller 123 of bag fold retainer 113, actuator 125 moves clevis 124 downward, compressing and retaining air bag 82 with roller 123.

Turning now to FIG. 16A, the side fold sequence has been completed, with bag compression assembly 20 compressing and retaining air bag 82. FIG. 16B is an enlarged view illustrating air bag 82 after the side fold sequence. Air bag 82 at this point, includes opposing ends 128 and 129 and has a width substantially identical to the width of reaction plate 87 as can be seen in FIG. 16C. As discussed previously, bag 82 may be folded without a reaction plate attached, in which case a predetermined dimension is established such as the dimensions of a reaction plate which would be attached to the bag at a later time, or other dimensions as desired. A center portion 130 of air bag 82 is located between ends 128 and 129, overlying reaction plate 87 or alternatively, if a reaction plate is absent, the area around the opening of the lower portion, to the desired dimension. The boundaries of center portion 130 correspond to reaction plate 87. At this point, ends 128 and 129 are reduced by the end reduction sequence to the dimensions of reaction plate 87.

Figures 17, 18:
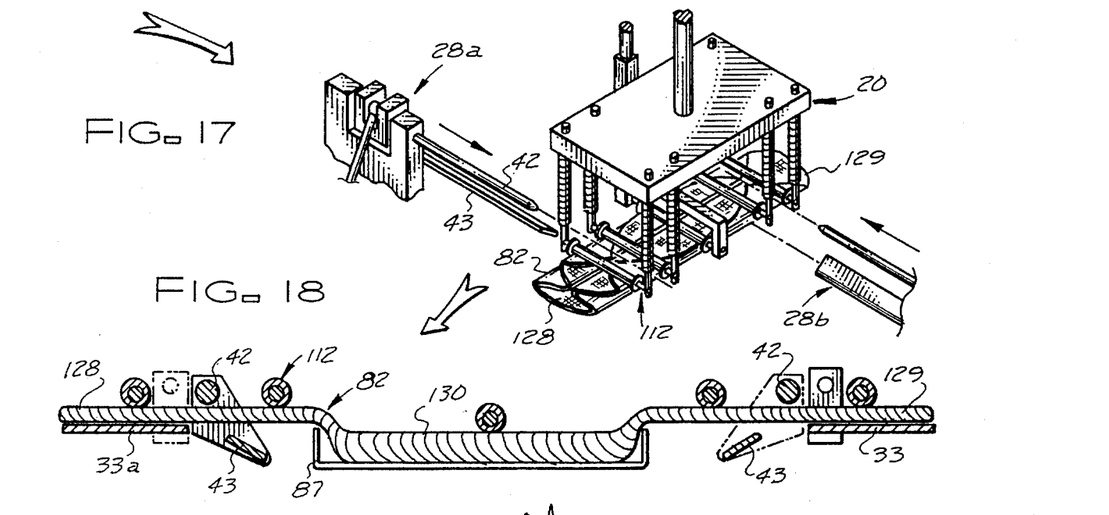
FIG. 17 is a perspective view of a portion of the bag folding system of FIG. 1, as it would appear during the positioning of end tuck assemblies.
FIG. 18 is an enlarged side view illustrating the positioning of the end tuck assemblies of FIG. 17.

As stated previously, bag compression assembly 20 is used to separate between the side fold sequence undertaken by side fold assembly 14, and the end reduction sequence. FIG. 17 illustrates the beginning of the end reduction sequence with end tuck assemblies 28 moving in the direction indicated by arrowed lines G, to the extended position described above. In the extended position, end tuck assemblies 28a and 28b each engage ends 128 and 129 of air bag 82 respectively. As can be seen with additional reference to FIG. 18, fold rods 42 and tuck blades 43 are positioned proximate ends 128 and 129 of air bag 82 between end fold blades 33 and reaction plate 87, with fold rods 42 overlying air bag 82 and tuck rods 43 underlying air bag 82.

Figure 19:
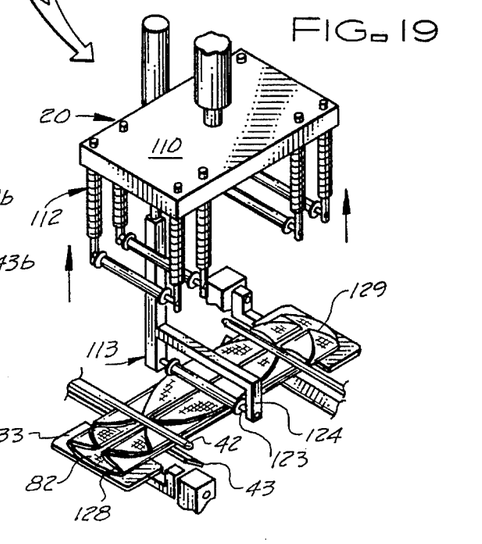
FIG. 19 is a perspective view of a portion of the bag folding system of FIG. 1, as it would appear during removal of the bag compression assembly, with the bag folding retainer engaging the bag.

At this point in the procedure, compression members 112 are removed from engagement with air bag 82 by moving mounting plate 110 to the raised position, as illustrated in FIG. 19. Bag fold retainer 113 is left in position to prevent unintentional unfolding of air bag 82.

Figure 20:
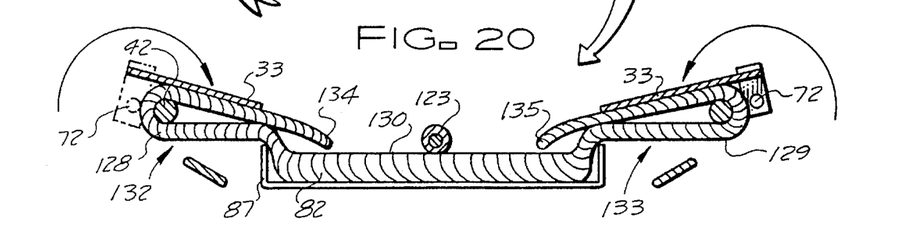
FIG. 20 is an enlarged side view illustrating the formation of end folds.

The actual folding involved in the end reduction sequence begins by rotating end fold blades 33 about pivot points 72 with motor 74 (not shown) moving end fold blades 33 from their support positions to their fold positions. It can now be seen why end blades 33 in the fold position are higher than in the support position, they must rotate over fold rods 42. Ends 128 and 129 of air bag 82 are folded about fold rods 42 effectively doubling over the ends of air bag 82 to form end fold portions 132 and 133 with tips 134 and 135 of ends 128 and 129 overlying central portion 130 of air bag 82 and reaction plate 87.

Figure 21:
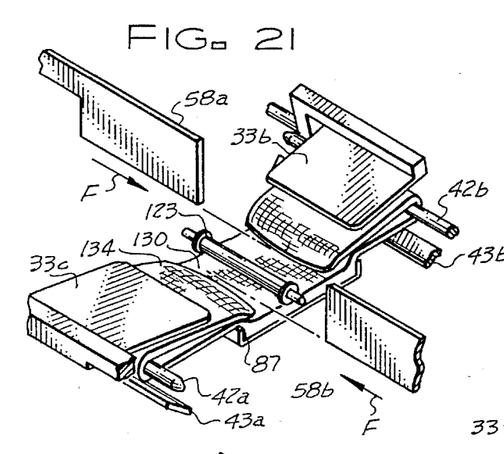
FIG. 21 is a perspective view of a portion of the bag folding system of FIG. 1, as it would appear beginning the clamping portion of the bag folding process.
Figure 22:
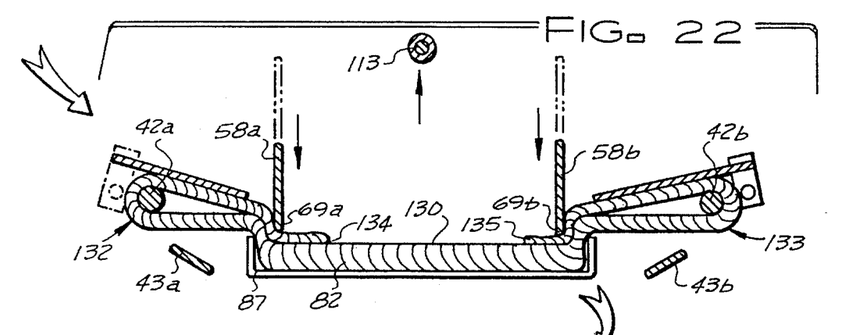
FIG. 22 is an enlarged cross sectional side view of a portion of the bag folding system of FIG. 1, as it would appear during an intermediate stage of the clamping portion of the bag folding process.
Figure 23:
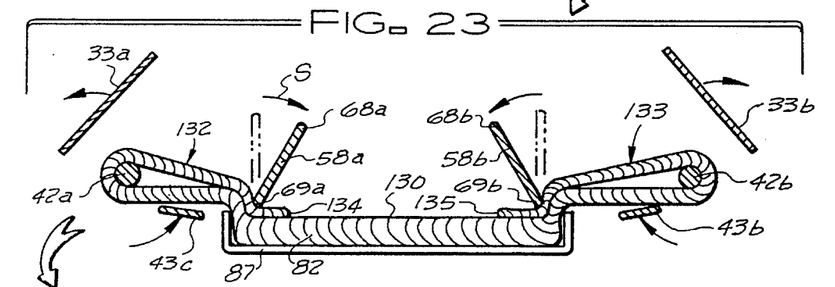
FIG. 23 is an enlarged cross sectional side view of a portion of the bag folding system of FIG. 1, as it would appear completing the clamping portion of the bag folding process.

End fold portions 132 and 133 are retained by clamp blades 58 of clamp assemblies 29 as can be seen in FIGS. 21–23. Referring specifically to 21 with additional reference to FIG. 1, clamp assemblies 29 are moved on rails 35 to their extended position in a direction indicated by arrowed line F, positioning clamp blades 58, in their upright position, such that they overly tips 134 and 135 of air bag 82 and reaction plate 87.

Referring specifically to FIG. 22 with additional reference back to FIG. 5, clamp blades 58 are moved to their lowered position by actuator 64, such that the lower edge 69 of clamp portions 59 engage tips 134 and 135, retaining them against the central portion 130 of air bag 82. At this point, with clamp blades 58 securing end fold portions 132 and 133, bag folding retainer 113 is moved to the raised position by activation of actuator 125.

Referring now to FIG. 23 with additional reference back to FIG. 5, clamp blade 58 is angled inward, with top edge 68 of clamp blade 58 moving inward in a direction indicated by arrowed line S. Clamp blade 58 is tilted by the operation of actuator 64 moving coupling 62 to the tilt position. The tilt of clamp blade 58 in relation to central portion 130 of air bag 82 is important as will be revealed below. After the final positioning of clamp blades 58, end fold blades 33 are rotated toward their support positions, removing them from the area to allow the end tuck to proceed without hindrance thereby. The end tuck step follows the end fold step and is commenced by tuck actuators 54 (not shown) rotating tuck blades 43 about fold rods 42. Tuck blades 43 engage air bag 82 intermediate clamp blades 58 and fold rods 42, carrying end fold portion 132 and 133 upward as it continues to move. Activation of tilt actuator 53 moves fold rod 42 to the tilt position as tuck blade 43 continues to its tuck position.

Figure 24:
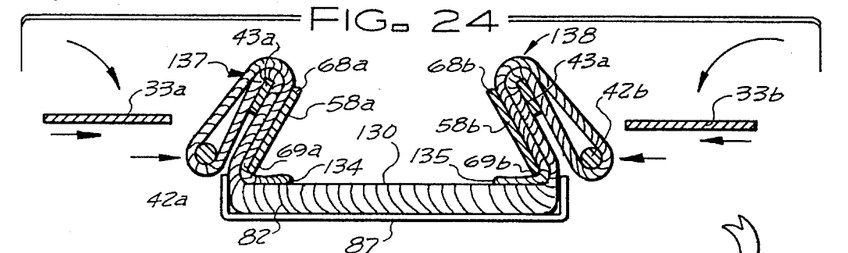
FIG. 24 is an enlarged cross sectional side view of a portion of the bag folding system of FIG. 1, as it would appear during formation of end tucks.

FIG. 24 illustrates air bag 82 after the completion of the tuck, wherein tuck blades 43 have been pivoted by actuator 54, tucking end fold portions 134 and 135 intermediate their respective clamp 58 and fold rod 42. The effective result of the tuck is to double up end fold portions 132 and 133 into end tucks 137 and 138 respectively. Fold rods 42 must be moved relative tuck blades 43, to permit a fold tuck or doubling of end fold portions 132 and 133. Movement of fold rods 42 is accomplished by tilting of tilt plate 40 as described previously in connection with FIG. 3. End tucks 137 and 138 end up being angled inward toward center portion 130, at an angle substantially similar to the angle of clamp blades 58.

Still referring to FIG. 24, end fold blades 33 which are rotated toward the support position described earlier in connection with FIG. 3, are rotated back to the fold position. This movement may be set up to pinch end tucks 137 and 138 against clamp blades 58 or preferably once in the fold position, end fold carriages 30 are moved toward the extend position. The extend position of end fold carriages 30 preferably include two positions. The first position extending end fold blades 33 sufficient to pinch end tucks 137 and 138 against clamp blades 58.

Figure 25:
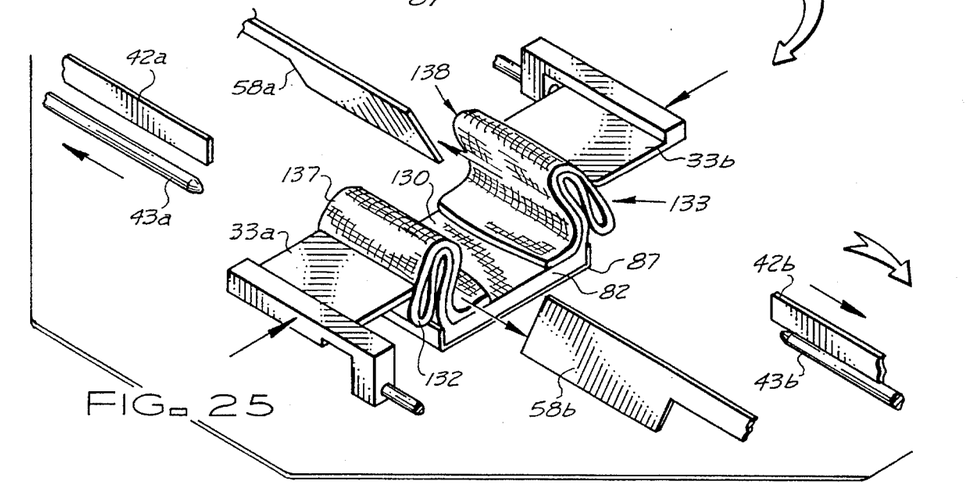
FIG. 25 is a perspective view of a portion of the bag folding system of FIG. 1, as it would appear during the supporting of the end folds and the removal of the end tuck assemblies and the clamp assemblies.

Referring now to FIG. 25, after end fold blades 33 engage and pinch end tucks 137 and 138, fold rods 42, tuck blades 43, and clamp blades 58 are removed by moving end tuck carriages 37 and clamp carriages 34 from the extended position to the retracted position. The slight inward fold of end tucks 137 and 137 retain tips 134 and 135 against center portion 130, even after clamp blades 58 have been removed.

Figure 26:
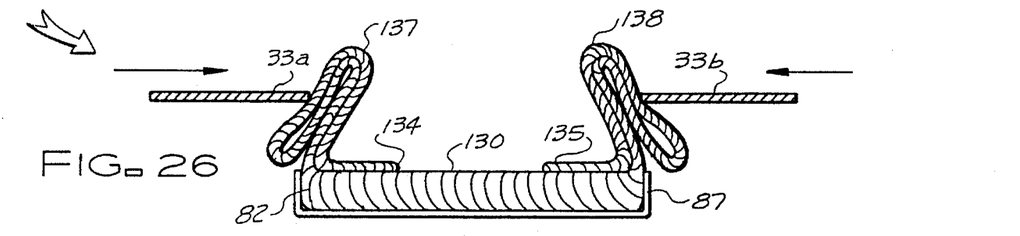
FIG. 26 is an enlarged cross sectional side view of a portion of the bag folding system of FIG. 1, as it would appear beginning the final fold.
Figure 27:
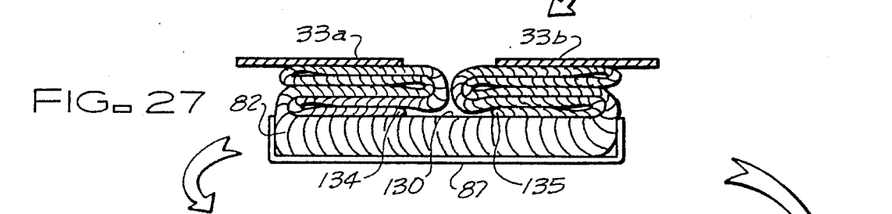
FIG. 27 is an enlarged cross sectional side view of a portion of the bag folding system of FIG. 1, as it would appear upon completion of the final fold.

The final fold, consisting of folding end tucks 137 and 138 over to overly center portion 130, is illustrated in FIGS. 26 and 27. This fold is accomplished by extending end fold carriages 30 to their second position, resulting in end tucks 137 and 138 being folded over tips 134 and 135 respectively, closely overlying center portion 130. As can be seen with specific reference to FIG. 27, end 128 and 129 of air bag 82 have been reduced to a combined dimension equal to or less than the dimensions of reaction plate 87.

Figures 28, 29, 30:
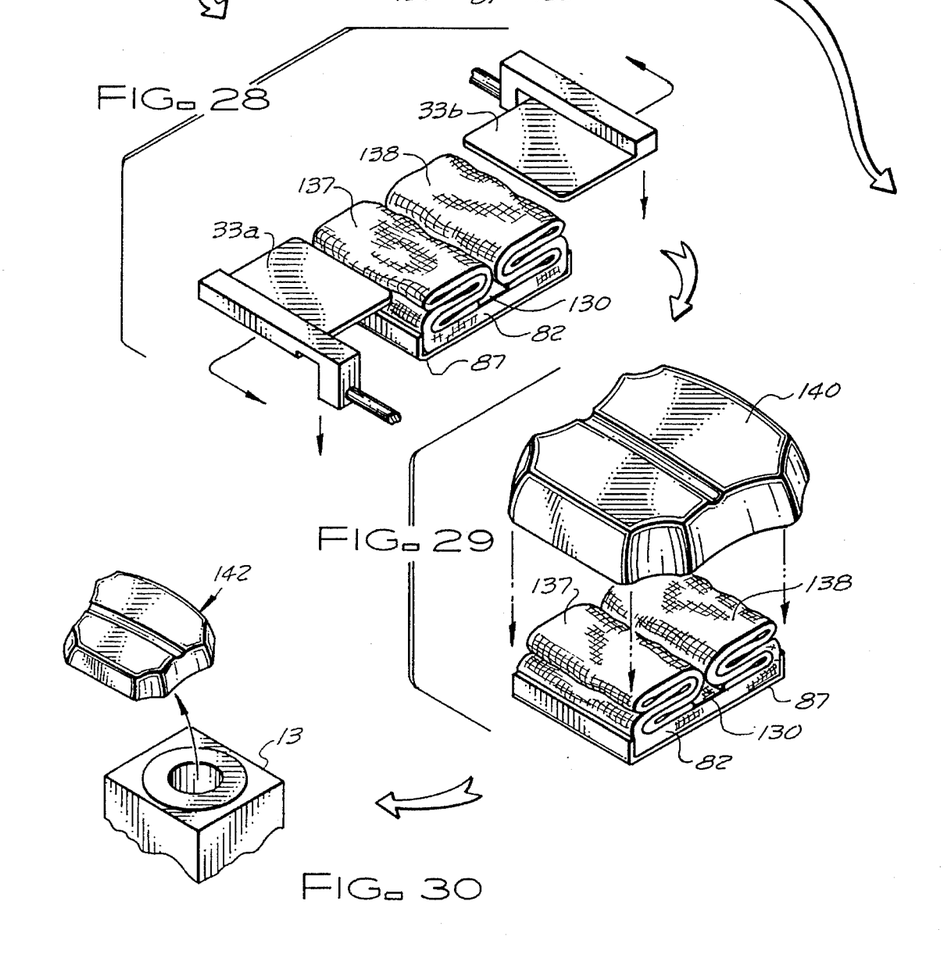
FIG. 28 is a perspective view of a portion of the bag folding system of FIG. 1, as it would appear during removal of end fold assemblies.
FIG. 29 is a perspective view of a cover being placed upon an air bag folded in accordance with the present invention.
FIG. 30 is a perspective view illustrating removal of the folded air bag from a clamping fixture.

FIG. 28 illustrates the removal of end fold blades 33 leaving the folded air bag. A cover 140 is then placed over air bag 82, to engage reaction plate 87 in a manner conventional with air bag assemblies, as shown in FIG. 29. The completed air bag assembly 142 is then removed from holding fixture 13 as shown in FIG. 30, ready to install in a vehicle.

Figure 31:
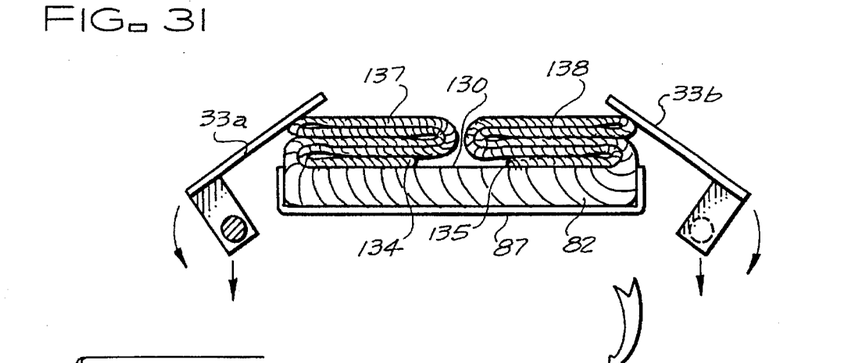
FIGS. 31–34 illustrate an alternate removal of end fold assemblies and placement of bag cover.
Figure 32:
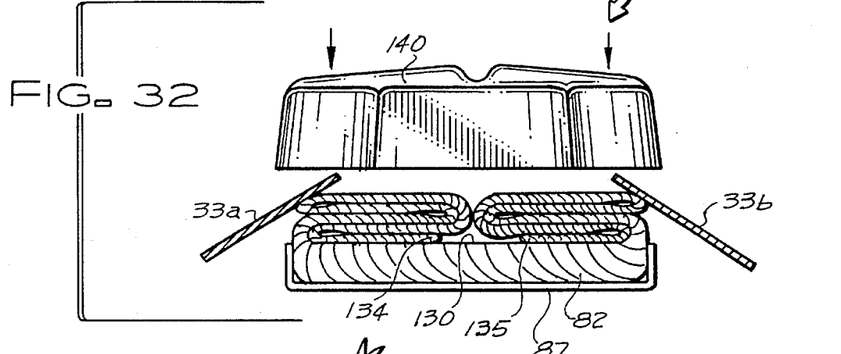
Figure 33:
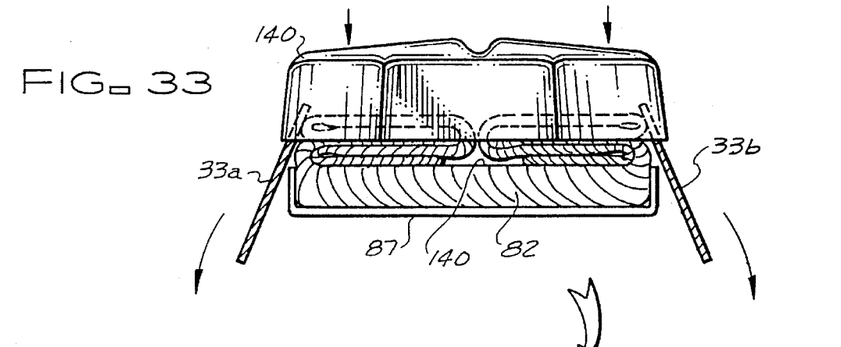

FIGS. 31–33 illustrate an alternate method of removing end fold blades 33 and installing cover 140. With additional reference back to FIG. 6, end fold paddles 33 are removed from engagement with air bag 82 by rotating end fold blades 33 towards the support position, and at the same time, activating actuator 73, thereby moving motor housing 70 to the lowered position. This motion combines to pull end fold blades 33 down and away from air bag 82, allowing cover 140 to be placed upon end fold blades 33 as they are removed. This eliminates the need for the operator to manually retain the folds of air bag 82 while cover 140 is emplaced. As can be seen in the sequence of FIGS. 31–33 end fold blades 33 continue to hold the folds of air bag 82 as cover 140 is lowered.

Figure 34:
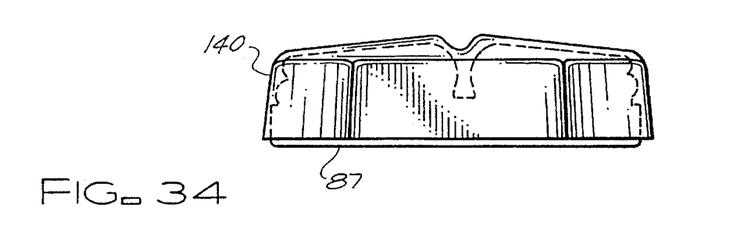

FIG. 34 illustrates air bag 82 with cover 140 secured in place to reaction plate 87.

Those skilled in the art will appreciate that control means is not shown, but is provided for operating and controlling the various actuators necessary for the operation of bag folding apparatus 10. Those skilled in the art will also appreciate that the precise programming instructions and the nature of the control imparted through the control means and actuators has little bearing on the present invention, other than in accomplishing the above discussed process. For example, while the preferred embodiment of the present invention primarily uses pneumatic actuators, those skilled in the art may adapt hydraulic or solenoid actuators to impart the above discussed movements. Moreover, those skilled in the art will fully appreciate that limit or position switches may employed in a conventional fashion within bag folding apparatus 10, to indicate to control means when desired positions are achieved through such movements.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of folding an air bag comprising the steps of:

supplying an air bag having a center portion, said center portion having predetermined parameters;

forming side folds in said air bag so as to define a first end adjacent to said center portion; and automatically reducing said first end of said side folded air bag by engaging said first end of said air bag with an end tuck assembly including a fold rod and folding said first end about said fold rod so as to form an end fold;

tucking said end fold by rotating said tuck blade relative said fold rod, and moving said fold rod, thereby producing an end tuck; and moving said end tuck to a folded position overlying said center portion and fitting within the parameters thereof.

2. A method as claimed in claim 1 wherein the step of folding said first end about said fold rod includes:

supplying an end fold blade rotatable between a support position an a fold position;

supporting said first end of said air bag with said end fold blade in the support position; and rotating said end fold blade to said fold position, thereby folding said first end about said fold rod.

3. A method as claimed in claim 2 providing in addition, prior to the step of tucking, the steps of:

providing a clamp blade having an upper edge and a lower edge; and clamping said first end adjacent a tip thereof with said lower edge of said clamp blade to retain said first end in said end fold.

4. A method as claimed in claim 3 wherein the step of clamping further includes rotating said upper edge of said clamp blade about said lower edge, toward said center portion of said air bag to form an angle less than 90 degrees with respect to said center portion.

5. A method as claimed in claim 4 wherein the step of engaging said first end of said air bag with said end tuck assembly includes moving said end tuck assembly from a retracted position to an extended position, in said extended position, said fold rod overlies said first end of said air bag between said end fold blade and said center portion, and said tuck blade underlies said first end of said air bag between said end fold blade and said center portion.

6. A method as claimed in claim 5 providing in addition, prior to the step of tucking and after the step of clamping, the step of rotating said end fold blade towards the support position.

7. A method as claimed in claim 6 wherein the step of moving said end tuck to a folded position further includes pinching said end tuck between said end fold blade and said clamp blade.

8. A method as claimed in claim 7 wherein the step of pinching said end tuck to a folded position further includes:

providing said end fold blade with the capability of moving from a retracted position to a first extended position and a second extended position;

rotating said end fold blade to the fold position; and moving said end fold blade to the first extended position to engage said end tuck.

9. A method as claimed in claim 8 wherein said step of moving said end tuck to a folded position further includes:

removing said fold rod and said tuck blade from the end tuck by moving said end tuck assembly to the retracted position;

removing said clamp blade; and moving said end fold blade to the second extended position, folding said end tuck against said center portion.

10. A method as claimed in claim 1 further including the steps of:

forming side folds in said air bag so as to define a second end adjacent to said center portion and opposite said first end; and automatically reducing said second end of said side folded air bag, to overlie said center portion and to fit within the parameters thereof.

11. A method as claimed in claim 10 wherein said step of automatically reducing said second end includes:

engaging said second end of said air bag with an end tuck assembly including a fold rod and a tuck blade parallel to and spaced from said fold rod;

folding said second end about said fold rod so as to form an end fold;

tucking said end fold by rotating said tuck blade relative said fold rod, and moving said fold rod, thereby producing an end tuck; and moving said end tuck to a folded position overlying said center portion.

12. A method as claimed in claim 11 wherein the step of folding said second end about said fold rod includes:

providing an end fold blade rotatable between a support position and a fold position;

supporting said first end of said air bag with said end fold blade in the support position; and rotating said end fold blade to said fold position, thereby folding said second end about said fold rod.

13. A method of folding an air bag comprising the steps of:
   supplying an air bag having a center portion, said center portion having predetermined parameters; and
   automatically forming side folds in said air bag so as to define a first end adjacent to said center portion and a second end adjacent to said center portion, opposite said first end including the steps of:
   retaining said air bag with a holding fixture;
   providing a first and a second side blade assembly positioned above and bracketing said holding fixture, said first and said second side blade assemblies having a plurality of side blades sloping towards said holding fixture;
   inserting said air bag over an upper most side blade of each of said side blade assemblies;
   clamping said air bag to each of said upper most side blades;
   lowering a center blade assembly having between said side blade assembly, closely overlying said air bag, said center blade assembly defining a plurality of slots having substantially the same degree of slope as said side blades, said slots configured to receive corresponding ones of said side blades; and
   inserting said air bag into said slots by consecutively inserting said side blades within said slots.

14. A method as claimed in claim 13 further including releasing said air bag from said upper most side blade of each side blade assembly during the insertion of a first of said side blades into said slots.

15. A method as claimed in claim 14 further including automatically reducing said first end and said second end of said side folded air bag, to overlie said center portion and to fit within the parameters thereof.

16. A method as claimed in claim 15 further including automatically retaining said side folded air bag prior to the step of automatically reducing.

17. A method as claimed in claim 16 wherein said step of automatically reducing said first end and said second end includes:
   engaging said first end and said second end of said air bag with a first end tuck assembly and a second end tuck assembly respectively, each end tuck assembly including a fold rod and a tuck blade parallel to and spaced from said fold rod;
   folding said first end and said second end about said respective fold rod so as to form a first end fold and a second end fold;
   tucking said end folds by rotating said respective tuck blade relative said respective fold rod, and moving said fold rods, thereby producing a first end tuck and a second end tuck; and
   moving said end tucks to a folded position overlying said center portion.

18. A method as claimed in claim 17 wherein the step of folding each of said first end and said second end about said respective fold rod includes:
   providing an end fold blade rotatable between a support position and a fold position;
   supporting one of said first end and said second end of said air bag with said end fold blade in the support position; and
   rotating said end fold blade to said fold position, thereby folding said one of said first end and said second end about said fold rod.

19. An air bag folding apparatus for automatically folding an air bag having a center portion, side folds and a first end adjacent said center portion, said apparatus comprising:
   a base;
   an end fold assembly carried by said base, said end fold assembly having an end fold blade movable between a support position for supporting said first end of said air bag and a fold position for folding said first end to form an end fold, said end fold assembly is movably carried by said base between a retracted position in which position said end fold blade supports and folds said first end of said air bag, and an extended position in which position said end fold blade folds said end tuck against said center portion of said air bag; and
   a tuck assembly carried by said base for forming an end tuck in said end fold.

20. An apparatus as claimed in claim 19 wherein said tuck assembly includes:
   a carriage movably carried by said base, between a retracted position and an extended position;
   a fold rod movably carried by said carriage, configured to closely overlie said first end of said air bag with the carriage in the extended position; and
   a tuck blade movably carried by said carriage, configured to underlie said first end of said air bag with the carriage in the extended position, said tuck blade being substantially parallel to said fold rod.

21. An apparatus as claimed in claim 19 further including a clamp assembly movably carried by said base, for clamping said end fold.

22. An apparatus as claimed in claim 19 wherein said air bag further includes a second end adjacent said center portion, said apparatus further including:
   a second end fold assembly carried by said base, said second end fold assembly having an end fold blade movable between a support position for supporting said second end of said air bag and a fold position for folding said second end to form a second end fold; and
   a second tuck assembly carried by said base for forming an end tuck in said second end fold.

23. An apparatus as claimed in claim 22 wherein said second end fold assembly is movably carried by said base between a retracted position, in which position said end fold blade supports and folds said second end of said air bag, and an extended position, in which position said end fold blade folds said end tuck against said center portion of said air bag.

24. An apparatus as claimed in claim 19 further including:
   a side fold assembly for forming said side folds in said air bag; and
   a bag compression assembly for compressing ant retaining said side folds in said air bag.

25. An apparatus as claimed in claim 24 wherein said side fold assembly includes:
   a carriage movably carried by said base;
   a first and a second side blade assembly carried by said carriage; and
   a center blade assembly carried by said carriage and rotatable between a lowered position between said side blade assemblies, and a raised position.

26. An apparatus as claimed in claim 25 wherein said center blade assembly includes:
   a plurality of parallel stacked center blades each having a central line;

a center divider joining said stacked blades, said center blades extending from said divider at an angle;

a plurality of slots defined by and located between said center blades.

27. An air bag folding apparatus for automatically folding an air bag having a center portion, said air bag coupled to a reaction plate with said center portion overlying said reaction plate and parameters of said center portion defined by said reaction plate, said air bag further including side fields and a first end adjacent said center portion, said apparatus comprising:

a base;

a holding fixture carried by said base for receiving said reaction plate, and securing said center portion of said air bag;

an end fold assembly carried by said base, said end fold assembly having an end fold blade movable between a support position spaced from said holding fixture for supporting said first end of said air bag, and a fold position adjacent said holding fixture for folding said first end to form an end fold, said end fold assembly is movably carried by said base between a retracted position spaced from said holding fixture, in which position said end fold blade supports and folds said first end of said air bag, and an extended position adjacent said holding fixture, in which position said end fold blade folds said end tuck against said center portion of said air bag; and a tuck assembly carried by said base for forming an end tuck in said end fold.

28. An apparatus as claimed in claim 27 wherein said tuck assembly includes:

a carriage movable carried by said base, between a retracted position spaced from said holding fixture and an extended position adjacent said holding fixture;

a fold rod movably carried by said carriage, configured to closely overlie said first end of said air bag with the carriage in the extended position, between said end fold blade in said support position and said holding fixture; and a tuck blade movably carried by said carriage, configured to underlie said first end of said air bag with the carriage in the extended position, between said end fold blade in said support position and said holding fixture, said tuck blade being substantially parallel to said fold rod.

29. An apparatus as claimed in claim 27 further including a clamp assembly movably carried by said base, for clamping said end fold to said center portion of said air bag.

30. An apparatus as claimed in claim 29 wherein said clamp assembly further includes:

a carriage movably carried by said base, movable between a retracted position and an extended position;

a clamp blade movably coupled to an attachment portion, said clamp blade movable between a raised and a lowered position; and said attachment member movably coupled to said carriage, said attachment portion movable between a vertical position and a tilt position.

31. An apparatus as claimed in claim 27 wherein said air bag further includes a second end adjacent said center portion, said apparatus further including:

a second end fold assembly carried by said base, said second end fold assembly having an end fold blade movable between a support position spaced from said holding fixture for supporting said second end of said air bag, and a fold position adjacent said holding fixture for folding said second end to form an end fold; and a second tuck assembly carried by said base for forming an end tuck in said second end fold.

32. An apparatus as claimed in claim 31 wherein said second end fold assembly is movably carried by said base between a retracted position spaced from said holding fixture, in which position said end fold blade supports and folds said second end of said air bag, and an extended position adjacent said holding fixture, in which position said end fold blade folds said end tuck against said center portion of said air bag.

33. An apparatus as claimed in claim 32 wherein said tuck assembly includes:

a carriage movable carried by said base, between a retracted position spaced from said holding fixture and an extended position adjacent said holding fixture;

a fold rod movably carried by said carriage, configured to closely overlie said second end of said air bag with the carriage in the extended position, between said end fold blade in said support position and said holding fixture; and a tuck blade movably carried by said carriage, configured to underlie said second end of said air bag with the carriage in the extended position, between said end fold blade in said support position and said holding fixture, said tuck blade being substantially parallel to said fold rod.

34. An apparatus as claimed in claim 33 further including a clamp assembly movably carried by said base, for clamping said second end fold to said center portion of said air bag.

35. An apparatus as claimed in claim 27 further including:

a side fold assembly for forming said side folds in said air bag; and a bag compression assembly for compressing and retaining said side folds in said air bag.

\* \* \* \* \*

UNITED STATES PATENT AND TRADEMARK OFFICE
CERTIFICATE OF CORRECTION

PATENT NO. : 5,456,651
DATED : 10 October 1995
INVENTOR(S) : William F. Baker, Don Reed It is certified that error appears in the above-indentified patent and that said Letters Patent is hereby corrected as shown below:

Column 13, Line 43 (Claim 1) insert --a tuck blade parallel to and spaced from said fold rod;-- after "and".

Signed and Sealed this

Twenty-third Day of January, 1996

Attest:

BRUCE LEHMAN

*Attesting Officer*    *Commissioner of Patents and Trademarks*